United States Patent
Humbert, Jr.

[15] 3,662,893
[45] May 16, 1972

[54] FILTER CARTRIDGE
[72] Inventor: Kingsley E. Humbert, Jr., Gastonia, N.C.
[73] Assignee: Wix Corporation, Gastonia, N.C.
[22] Filed: Aug. 25, 1969
[21] Appl. No.: 852,597

[52] U.S. Cl. ............................ 210/315, 210/338, 210/342, 210/443, 210/493, 210/496
[51] Int. Cl. ........................................................ B01d 27/06
[58] Field of Search ................. 210/315, 507, 508, 458, 496, 210/338, 342, 440, 443, 493

[56] References Cited

UNITED STATES PATENTS

| | | |
|---|---|---|
| 2,746,608 | 5/1956 | Briggs ............................... 210/508 X |
| 3,398,837 | 8/1968 | Adams ............................... 210/508 X |
| 3,467,256 | 9/1969 | Humbert et al. ................... 210/315 X |
| 3,352,423 | 11/1967 | Osterman ........................... 210/496 |

Primary Examiner—Samih N. Zaharna
Assistant Examiner—Fredrick F. Calvetti
Attorney—Shoemaker & Mattare

[57] ABSTRACT

A filter cartridge having a pleated paper filter element therein and concentrically therewith a molded porous filter element that has a resin incorporated therein, the molded element having an outer surface configuration providing channels for the flow of fluid and with the molded element providing a support for the inner peaks of the pleated paper filter element.

2 Claims, 10 Drawing Figures

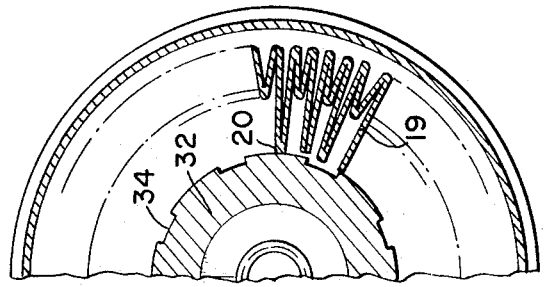
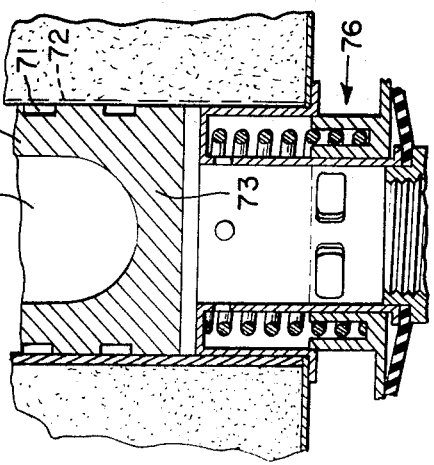
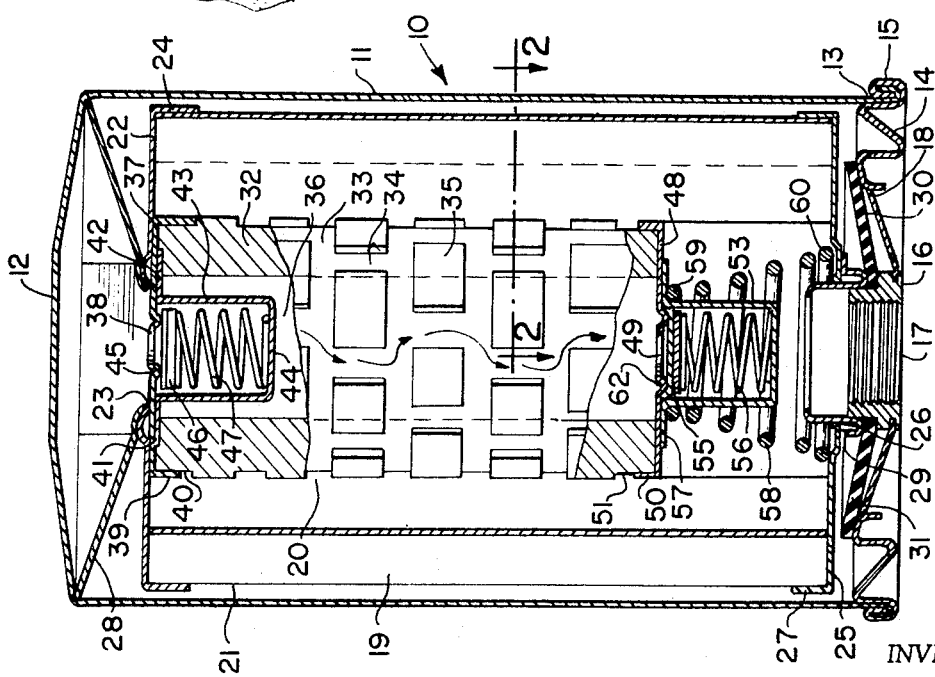
PATENTED MAY 16 1972
3,662,893
SHEET 1 OF 2
FIG.2.
FIG.3.
FIG.4.
FIG.1.
INVENTOR
KINGSLEY E. HUMBERT, JR.
BY Shoemaker and Mattare
ATTORNEYS

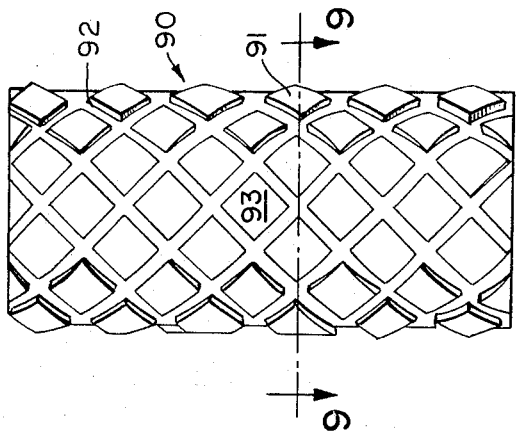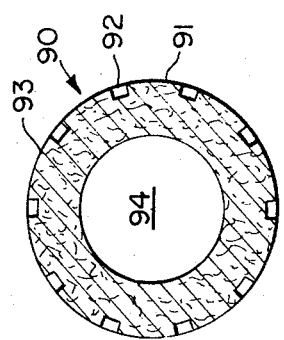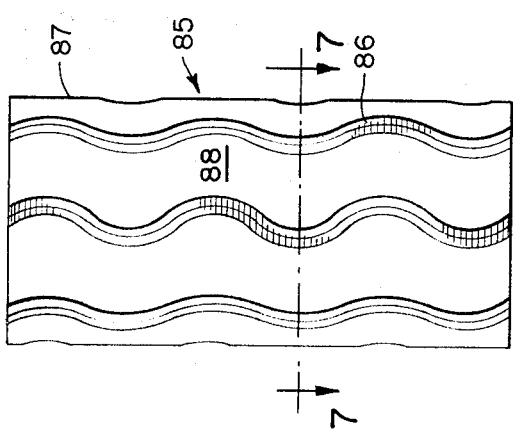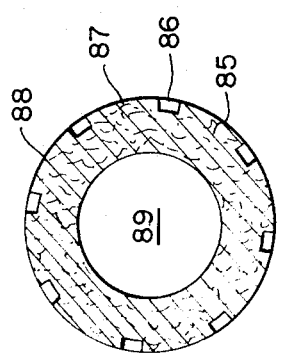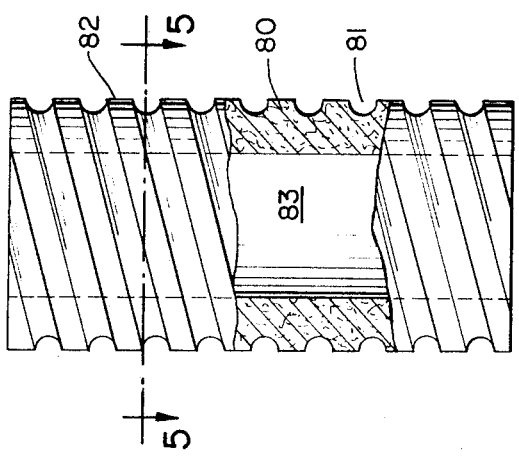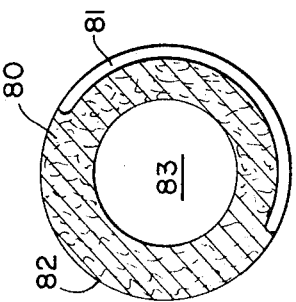

FILTER CARTRIDGE

This invention relates to a filter cartridge having a pleated paper filter element and a molded porous filter element therein, the molded element forming the support for the pleated element.

An object of this invention is to make a molded porous filter element having a surface configuration, which is placed within a pleated paper filter element with the surface contacting the inner pleats of the pleated element and forming a support for the pleated element.

A further object is to dispense with the inner tube within the pleated element and having the molded element provide the function of the inner tube together with being a filtering means for the fluid.

Another object is to provide a molded porous filter element within the pleated paper filter element and with regard to the manner of placement of a valve or valves or as to the construction of the molded element, the molded element will be in parallel relative to the path of flow of the fluid with the pleated element.

Other objects and the many advantages will become apparent when considered in connection with the specification and accompanying drawings wherein:

FIG. 1 is a sectional view in elevation of one form of a filter cartridge with one form of a molded fibrous filter element therein;

FIG. 2 is a cross-sectional view of FIG. 1 taken on line 2—2 of FIG. 1;

FIG. 3 is a partial sectional view in elevation of the lower part of FIG. 1 but showing a modification of the molded filter element;

FIG. 4 is a partial sectional view in elevation of a modified form of FIG. 3 showing an anti-drain back and by-pass valve in association with the filter cartridge;

FIG. 5 is an elevational view partially broken away of a modified form of the molded filter element;

FIG. 6 is a cross-sectional view of the molded element taken on line 4—4;

FIG. 7 is an elevational view of a further modified form of the molded filter element;

FIG. 8 is a cross-section of FIG. 6 taken on line 7—7;

FIG. 9 is an elevational view of a still further modified form of the molded filter element; and FIG. 10 is a cross-section of FIG. 8 taken on line 9—9.

The filter cartridge as shown in FIG. 1 is a spin-on throw-away type, however, it is to be understood that the filter element herein described may be inserted into any suitable type of cartridge or container. The cartridge or container generally indicated at 10 comprises a body 11 having a closed end wall 12 and an open end 13 closed by a closure plate 14 by a rolled seam 15 or any other means of attaching the closure plate to the body may be used. The closure plate has thereon a nut formation 16 by means of which the cartridge may be mounted to a supporting structure, usually the motor of an automobile or other point of usage. The nut 16 becomes the outlet 17 for the filtered fluid while a series of openings 18 surround the outlet and provide inlets to the cartridge for the fluid to be filtered.

Mounted within the casing is a filter media 19 composed of resin impregnated pleated paper having inner peaks 20 and outer peaks 21. The pleat formation may be of any of the well known types, such as a straight full width stretch or a M-pleat. The filter media 19 has an end cap 22 thereon which is adjacent the closed end of the housing 10. The end cap 22 has an opening 23 approximately in the center thereof and a flange 24 thereon. The end cap 22 engages with and is sealed to the end of the filter media as well as one end of the outer peaks 21. The filter media 19 also has an end cap 25 adjacent the open end 13 of the housing. The end cap 25 has an opening 26 approximately in the center thereof which surrounds the outlet 17 and has a flange 27 thereon. The end cap 25 also engages with and is sealed to the filter media 19 in the same manner as the end cap 22. Mounted between the closed end 12 of the housing 10 and the end cap 22 is a resilient means 28 such as a leaf spring which forces the filter element downwardly into engagement with the seat 29 surrounding the outlet 17. Carried by the nut 16 and in engagement with the seat 29 is a rubber ring-like structure 30 the inner periphery of which seals the outlet from the inlet and the outer peripheral portion provides an anti-drain back valve 31 for the housing by extending over the inlet openings 18. The pleated paper filter media 19 may or may not have a foraminous outer tube surround the same.

Concentrically mounted within the pleated paper filter media 19 and in direct contact with the inner peaks 20 is a molded filter block 32 which is made from a fibrous material such as paper pulp, natural or synthetic fibers which have been impregnated with a resin compound and molded into the desired shape having a desired outer surface configuration or it may be of molded granular material such as saw dust, plastic beads or the like.

The outer surface of the block 32 shown in FIG. 1 is provided with a plurality of circumferential grooves 33 and a plurality of spaced short vertical grooves 34. The vertical grooves 34 between one pair of circumferential grooves 33 being offset from the vertical grooves between adjacent pairs of circumferential grooves so that the vertical grooves are not in vertical alignment but provide a tortuous path, as shown by the arrows, along the outer surface of the block 32. The meeting of the circumferential grooves 33 and the vertical grooves 34 provide a plurality of rectangular configurations 35. By virtue of the offsetting of the vertical grooves 34 with relation to the circumferential grooves 33 and to the next adjacent vertical grooves the rectangular configurations 35 are formed wherever the grooves meet and between the various grooves so that the rectangular configurations between a pair of circumferential grooves are offset vertically and horizontally with respect to the rectangular configurations between adjacent pairs of circumferential grooves. Thus while the circumferential grooves are continuous around the filter block 32 the vertical grooves 34 are not continuous or in a straight line vertically. The vertical groove between any pair of rectangles of one ring of rectangles about the filter block is offset with respect to the vertical grooves between adjacent rectangles of the adjacent rings of rectangles about the filter block. The rectangles of the filter block are in direct contact with the inner peaks 20 of the pleated filter media 19 and thereby support the inner peaks 20 and the pleated filter media 19.

The fluid being filtered by the pleated filter media 19 will flow downwardly along the surface of the stretches of the pleats, after passing through the pleated paper, to the outlet 17 and some of the fluid will flow along the circumferential and vertical grooves to the outlet 17.

The filter block 32 in its basic form is of a tubular shape and has a through passage 36 therein. As shown in FIG. 1, filter block 32 has an end cap 37 on the upper end thereof. The end cap 37 has a central opening 38 therein and an outer flange 39. The outer surface of the upper end of the block 32 is provided with a circumferential groove 40 therein into which the flange 39 is seated. The upper end of the block 32 has a shoulder 41 formed therein on which is seated an outwardly extending flange 42 of a valve housing 43 which is in the form of an inverted cap and is of a spider formation having a solid end 44. The end cap 37 around the central opening 38 has formed therein a ridge 45 forming a valve seat. A valve 46 freely mounted in the valve housing engages the valve seat 45 and closes the opening 38 under the influence of a spring 47 bearing at one end against the valve 46 and at the other end against the end 44.

The filter block 32 has at the other end thereof an end cap 48 having a central opening 49 and a flange 50. The filter block 32 is provided with a circumferential groove 51 with the flange 50 seated therein. Surrounding the opening 49 and formed in the end cap 48 is a valve seat 52. Affixed to the under side of the end cap 48 is a valve housing 53 in the form of an inverted cap and is of a spider formation having a solid end 54. Within the valve housing is a valve 55 engaging the valve seat 52 under pressure of a spring 56 bearing at one end against the valve 55 and at the other end against the solid end 54. The spring 56 has a higher compression value than the spring 47. The valve housing 53 is provided with an outwardly directed flange 57 which is welded or otherwise attached to the under side of the end cap 48.

A coil spring 58 having one end 59 engaging the flange 57 and another end 60 bearing against the upper side of the end cap 25 forces the filter block 32 upwardly within the pleated paper filter into engagement with the under side of the end cap 22 and into the proper position.

The form of the invention disclosed in FIGS. 1 and 2 would operate as a valved-parallel filter wherein when the filter is first placed in operation all filtering is accomplished by the pleated paper filter wherein the fluid would flow through the pleated paper and be filtered thereby, after passing through the pleated paper the filtered fluid will flow downwardly along the pleats and also along the grooves provided in the molded filter block. When the pleated paper becomes caked with the filtrate a pressure will build up in the housing which will act on valve 46 forcing the same open and allowing the fluid to enter into the center of the molded filter block where it will pass through the wall of the molded block and be filtered thereby. The filtered fluid will then flow along the grooves provided in the outer surface of the block and along the pleats to the outlet. Upon a build-up of filtrate on the inner wall of the molded block a higher pressure will form in the housing whereupon the valve 55 will open allowing the fluid to flow directly to the outlet without being filtered.

When, however, the valve 46 is not placed in the filter cartridge the fluid will be filtered by both filter media in parallel by passing inwardly through the pleated paper and outwardly through the molded block. In this case only valve 55 is used to by-pass the filter media.

The form of the invention shown in FIG. 3 is a modified form using the pleated paper filter and other structure of FIG. 1 but may or may not use a valve similar to valve 46 of FIG. 1. The change of this modified form is with respect to the shape of the molded filter block 70. The block 70 has the circumferential grooves 71 and the connecting vertical grooves 72 formed in the outer surface thereof similar to those of FIG. 1. The block 70 is formed with a closed bottom 73 and is provided with a central opening 74 throughout its length to the closed bottom. Thus the entire block side wall and the bottom, filter the fluid passing through the filter cartridge. The flow of the fluid through the two filter media is toward the center of the pleated paper and outwardly from the center of the filter block. The fluid after being filtered will flow in the same manner as recited previously in the description of FIG. 1 and 2.

FIG. 4 shows a structure similar to FIG. 3 but using a combined anti-drain back and by-pass valve generally designated 76. The valve 46 shown in FIG. 1 may be used in the upper end of the filter block if desired and when a valve is needed at that point. The combined valve 76 is the same as shown in my U.S. Pat. No. 3,235,085 granted Feb. 15, 1966 and operates in the same manner as described therein. The combined valve will by-pass the entire filter assembly when both filters are coated with the filtrate and allow the fluid to pass directly from the inlet to the outlet.

The modified forms of the invention shown in FIGS. 5, 7 and 9 all relate to the outer surface configurations of the filter block.

The form shown in FIG. 5 is of a filter block 80 having a spiral groove 81 molded in the outer surface 82 thereof. The block 80 has a central opening 83 throughout its length, however, a solid end similar to that shown in FIG. 3 may be used. The grooves 81 provide flow passages for the filtered fluid after it has passed through the filter block 80. Those portions of the outer surface 82 between the grooves 81 provide the support for the inner peaks of a pleated paper filter media when the same is placed around the block 80.

FIG. 7 shows another modified form of a filter block 85 wherein longitudinal grooves 86 are molded in the surface 87. The grooves are of serpentine form and provide a high surface 88 between them which act as a support for the inner peaks of the pleated paper when placed around the block 85. The block 85 is provided with a central opening 89 throughout its length but may be provided with a closed bottom similar to that shown in FIG. 3. The grooves 86 provide the flow passages for the filtered fluid as previously described with regard to the other grooves.

A still further modified form is shown in FIG. 9 wherein the filter block 90 has molded on the outer surface 91 a plurality of spiral grooves 92. The grooves 92 spiral in opposite directions so that they cross each other at a plurality of points. The grooves of each direction are spaced from each other so that when they cross each other a high area 93 is provided between the grooves and the crossings. The high area being in the shape of a diamond when the block is held vertically as shown. The high areas 93 provide the support for the inner peaks of the pleated paper media. The block 90 is provided with a central opening 94 throughout its length, however, it may have a closed bottom as shown in FIG. 3.

It is to be understood that the molded filter block may be molded in various sizes to fit into a pleated paper filter media having a center opening of such various sizes and to meet the requirements of the particular need of the filter cartridge for the amount of fluid needed to be filtered in any set amount of time and production.

Thus a molded filter block of the composition hereinbefore set forth may be provided with a surface configuration to provide flow passages for the filtered fluid and also directly support the pleated paper filter media without having to provide a center tube as in the pleated paper filters of the prior art.

Having now shown and described specific embodiments of the invention, it is to be understood that such is not in any way limiting the scope of the claims appended thereunto.

I claim:

1. A filter cartridge comprising a housing having a closed end and an open end, closure means closing the open end, inlet and outlet openings in the closure means, a pleated paper filter media having inner and outer peaks within the housing, the paper filter media having a longitudinal central opening therein with the inner peaks forming the periphery of the central opening, a molded cylindrical filter block having an outer surface positioned within the central opening, the outer surface having a plurality of high areas throughout the length of the block, the high areas being non-continuous circumferentially and displaced vertically from each other, the placement of the high areas forming circumferential grooves and a plurality of short vertical grooves with the short grooves being displaced from each other but interconnected vertically by the circumferential grooves providing tortuous flow passages for the filtered fluid between the inner peaks and the filter block to the outlet, the high areas having spaced portions thereof in vertical alignment providing support for the inner peaks, the filter media and block being interposed between the inlet and outlet whereby fluid entering the inlet will be filtered before passing through the outlet.

2. A filter cartridge comprising a housing having a closed end and an open end, closure means closing the open end, inlet and outlet openings in the closure means, a pleated paper filter media having inner and outer peaks within the housing, the paper filter media having a longitudinal central opening therein with the inner peaks forming the periphery of the central opening, a molded cylindrical filter block having an outer surface positioned within the central opening, the outer surface having a plurality of high areas throughout the length of the block, the high areas being non-continuous circumferentially and vertically with each circumferential area being displaced with respect to the adjacent vertical area, the placement of the high areas forming a plurality of spiral grooves, the grooves spiralling in opposite directions and connecting with each other at spaced points about the high areas, the connections and the spiralling of the grooves providing tortuous flow passages for the filtered fluid between the inner peaks and the filter block to the outlet, the high areas having spaced portions thereof in vertical alignment providing support for the inner peaks, the filter media and block being interposed between the inlet and outlet whereby fluid entering the inlet will be filtered before passing through the outlet.

* * * * *